May 21, 1957  W. A. GEYGER  2,793,336
MEANS FOR ELIMINATING ASYMMETRY ZERO-DRIFT ERRORS
IN MAGNETIC SERVO AMPLIFIERS
Filed March 28, 1955  3 Sheets-Sheet 2

INVENTOR
W. A. GEYGER
BY
ATTORNEYS

INVENTOR
W. A. GEYGER

United States Patent Office 2,793,336
Patented May 21, 1957

2,793,336

MEANS FOR ELIMINATING ASYMMETRY ZERO-DRIFT ERRORS IN MAGNETIC SERVO AMPLIFIERS

Wilhelm A. Geyger, Takoma Park, Md., assignor to the United States of America as represented by the Secretary of the Navy Application March 28, 1955, Serial No. 497,481

9 Claims. (Cl. 318—30)

(Granted under Title 35, U. S. Code (1952), sec. 266)

The invention described herein may be manufactured and used by or for the Government of the United States of America for governmental purposes without the payment of any royalties thereon or therefor.

This invention relates to magnetic amplifiers employed in servo-systems for controlling the operation of a two-phase reversible motor and more particularly to those systems where the elimination of zero-drift due to lack of symmetry is of major importance.

In magnetic servo-amplifiers of the type heretofore devised it has been the usual practice when employed in synchro-systems to make the saturable reactor and rectifier components of the system as nearly identical as possible. This is achieved by applying well known matching procedures to the components, which operation represents a considerable portion of the cost of labor in the fabrication and testing of these systems.

Furthermore, in the prior art devices, particularly when applied to the control of a two-phase reversible motor in position-indicating synchro-transmission systems, it is the usual practice to employ the same frequency of supply voltage applied to the magnetic amplifier as the frequency employed to operate the motor. With such an arrangement an error signal received from the amplifier as the result of symmetry of the component parts thereof, for example, is of necessity of the same frequency as the power supply current for the motor and the motor therefore is unable to distinguish between an error signal as a result of this asymmetrical condition and a signal from the synchro-control transformer when the instant setting thereof is different from the setting of the synchro-generator. This error signal is referred to herein as a signal causing an error in the motor setting which represents a departure from the zero-drift output of the magnetic amplifier and, therefore, is undesirable. The operation of the motor in response to this error or drift signal causes a false operation or movement of the movable element of the synchro-control transformer which in turn not only destroys the phase matched relation between the synchro-generator and the synchro-control transformer with respect to the instantaneous setting of the respective movable elements thereof but in addition introduces a false input signal into the magnetic amplifier which further aggravates this condition.

The present invention possesses all of the advantages of the systems of the prior art and none of the foregoing disadvantages. In accordance with the teaching of the present invention the power supply of the magnetic amplifier is of a different frequency than the power supply current to the two-phase motor to be controlled whereby error signals as the result of symmetry of the magnetic amplifier are ineffective to cause motor operation. More specifically, the frequency of the power supply to the magnetic amplifier is of a higher order than the frequency of the supply current to the motor and preferably an odd multiple thereof. In achieving this result an arrangement is provided in which both frequencies are obtained from a single source of power supply and without the necessity of employing separate power supplies of different frequencies. This result is achieved by employing a frequency multiplier intermediate the source of power and the magnetic amplifier whereby the frequency of the power sent into the magnetic amplifier is an odd multiple of the frequency of the power sent into the motor, as will be more clearly apparent as the description proceeds. The system of the present invention in addition to eliminating the error drift of the controlled motor usually found in systems of this type also provides an arrangement in which the speed of response to a change in the setting of the synchro-generator is materially improved.

One of the objects of the present invention is to provide a position-indicating synchro-transmitting system having new and improved means for eliminating a drift-error signal therefrom as the result of asymmetry of the push-pull magnetic amplifier.

Another object is the provision of new and improved means for increasing the speed of response of the magnetic amplifier to a signal from the synchro-control transformer.

Another object is to increase the efficiency of the magnetic amplifier employed with servo-control systems.

A further object is to provide a new and improved magnetic amplifier of improved efficiency in which the size of the components comprising the coil and core structures are reduced without reduction in the power output thereof.

A still further object is to provide a magnetic amplifier for use with a servo-control system in which the power input thereto is obtained from a frequency tripler circuit having means for improving the wave form of the power current.

Other objects and many of the attendant advantages of this invention will be readily appreciated as the same becomes better understood by reference to the following detailed description when considered in connection with the accompanying drawings wherein.

Figure 7:
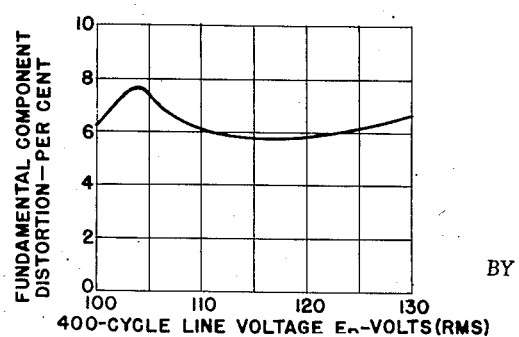
Figure 6:
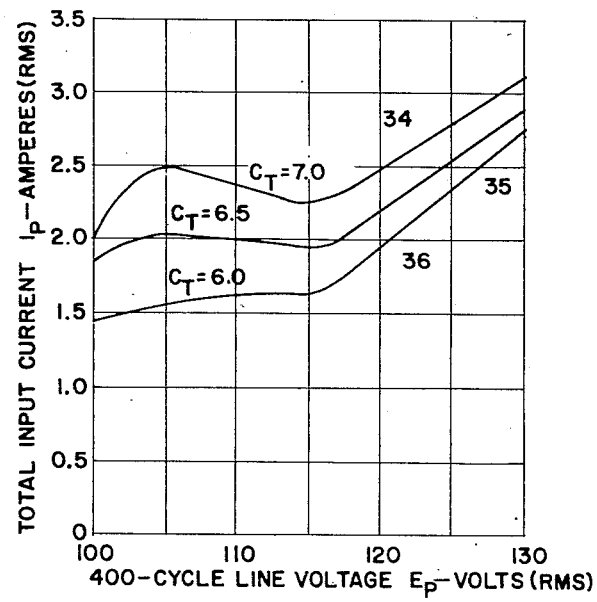

Fig. 6 is a chart in graph form on which is shown variations in input current corresponding respectively to different values of 400 cycle line voltage when different values of capacitance in the tank circuit are employed; and Fig. 7 is a graph in which is shown the percent distortion in the fundamental component of the 1200 cycle output voltage applied to the magnetic amplifier and corresponding respectively to different values of the 400 cycle current voltage.

Figure 1:
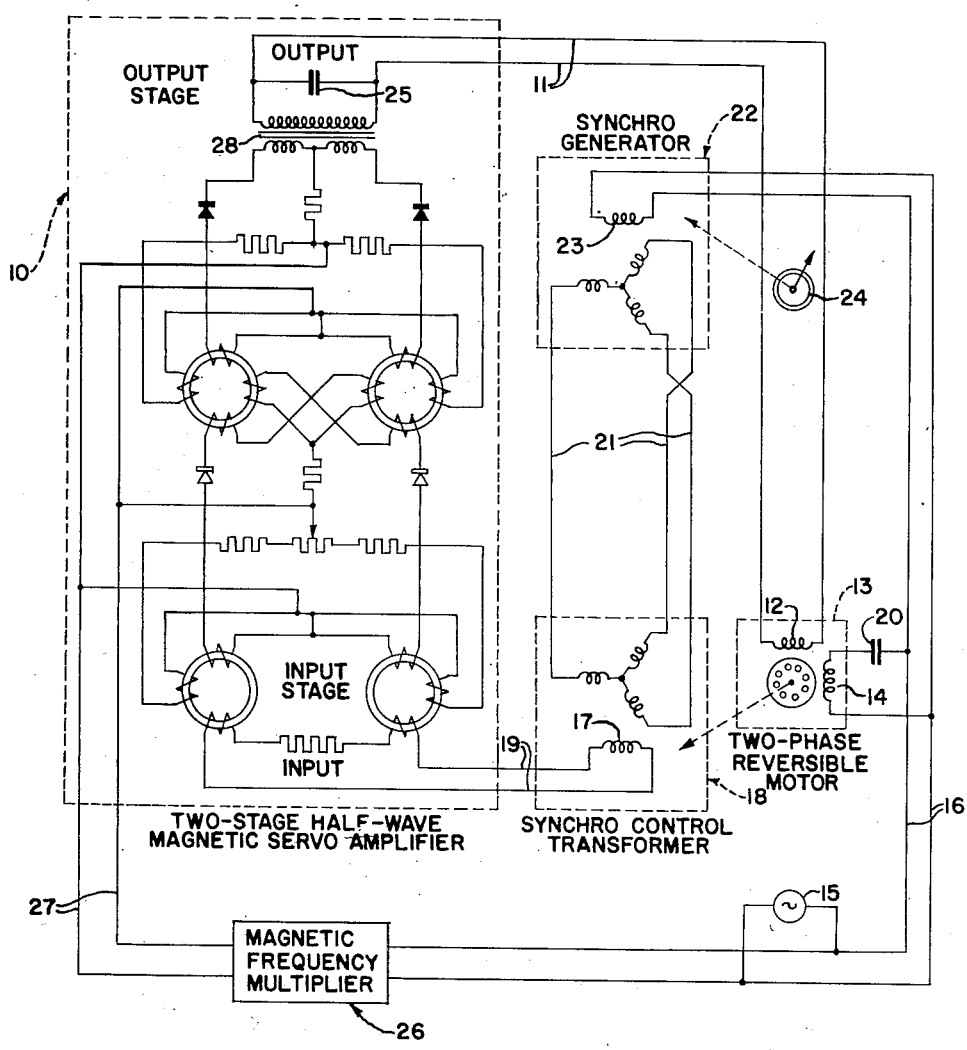
Fig. 1 is a circuit diagram illustrating a position-indicating synchro-transmission system employing a frequency multiplier in accordance with a preferred embodiment of the invention.

Referring now to the drawings for a more complete understanding of the invention and more specifically to Fig. 1 thereof, there is shown thereon a position-indicating synchro-transmission system having a two-phase motor which is operated by a special combination of a two-stage half-wave magnetic servo-amplifier and a magnetic frequency multiplier or frequency converter in a manner to eliminate asymmetry zero-drift errors of the amplifier, as will more clearly appear as the description proceeds. In the arrangement of Fig. 1 a two-stage half-wave magnetic servo-amplifier is indicated generally by the numeral 10, the output of which is connected as by the conductors 11 to the control winding 12 of a two-phase reversible motor indicated generally by the numeral 13. The line field winding 14 of the motor is continuously connected to a source of alternating current 15, such, for example, as 400 cycles per second as by the conductors 16, a capacitor 20 being included in the circuit to the line field winding to effect a suitable phase shift between the currents flowing in the motor windings 12 and 14 to cause satisfactory operation of the motor when the currents applied thereto respectively are of the same frequency.

The rotatable motor element is operatively connected to the rotor component 17 of the synchro-control transformer generally indicated by the numeral 18 whereby the synchro-control transformer winding is movable by the two-phase reversible motor to different settings corresponding respectively to instant settings of the movable element of the two-phase reversible motor. If desired, this connection may advantageously include a gear arrangement as is well known in the art. The rotor component 17 of the synchro-control transformer is connected as by the conductors 19 to the input of the first or input stage of the magnetic servo-amplifier 10. The stator windings of the synchro-control transformer are connected as by the conductors 21 to the stator windings of a synchro-generator 22. The rotor 23 of the synchro-generator is energized by the A. C. source 15 over conductors 16 and movable to different settings by the control element 24 operatively connected thereto as shown to any desired setting.

In the preferred embodiment of the invention illustrated on Fig. 1 the two-stage half-wave magnetic servo-amplifier is similar in construction and operation as the two-stage magnetic amplifier described in my U. S. Patent No. 2,725,521 and comprises an input stage of the push-pull type and a push-pull output stage operatively connected thereto, these two stages being mutually coupled by differential windings of the output-stage cores, as illustrated. The secondary winding of the output transformer 28 is connected to a condenser 25 for demodulating the 1200 cycle carrier frequency whereby the fundamental 400 cycle voltage is applied to the control winding 12 of the two-phase motor 13 when a 400 cycle signal is applied to the half-wave amplifier by the rotor component 17 of the synchro-control transformer, this 400 cycle signal being of substantially sinusoidal waveform.

The operation of the circuit of Fig. 1 will now be described. Let it be assumed, by way of example, that the control element 24 is at an angular setting corresponding to a setting of the rotatable element of the two-phase motor 13 and the rotor 23 of the synchro-generator 22 is set at the same setting as the rotor component 17 of the synchro-control transformer 18. Under these conditions no voltage is induced in the rotor component 17 of the synchro-control transformer and the input of the amplifier 10 therefore is not energized. Under these conditions there is no energization by the output stage transformer 28 of the wires 11. The control winding 12 of the two-phase motor 13, therefore, will be de-energized and the motor 13 will remain at rest.

Let it now be assumed that the control element 24 is moved to a new setting. When this occurs, a voltage will be induced in the rotor component 17 of the synchro-control transformer, which voltage is applied to the input of the servo-amplifier causing a 400 cycle output current to be supplied by the output transformer of the servo-amplifier to conductors 11 and thence to winding 12 of the two-phase motor 13. This 400 cycle energization of control winding 12 causes the motor to operate by reason of the continuous 400 cycle energization of the line field winding 14 thereof. The direction of movement of the rotatable element of the motor is controlled by the actual phase relationship between the control-transformer voltage generated at rotor component 17 of the synchro-control transformer which causes a current to flow through winding 12 of two-phase motor 13 thereby causing the motor 13 to operate in a direction controlled by the mutual phase relationship of the currents flowing through the motor windings 12 and 14, the phase of the current in winding 12 being in accordance with the phase relationship of the current induced in rotor component 17 with respect to the current applied to winding 14 from the A. C. source 15.

In accordance with the teaching of the present invention the magnetic amplifier is energized by a frequency converter or magnetic frequency multiplier indicated generally by the numeral 26 which, in accordance with the preferred embodiment disclosed on Fig. 1 multiplies the frequency of 400 cycles per second applied thereto to a frequency of 1200 cycles per second. This current of 1200 cycle frequency is applied by conductors 27 to both stages of the magnetic servo-amplifier 10 where it is employed as a carrier and is modulated by the 400 cycle signal current applied to the amplifier by conductors 19; and, due to the saturating functions of the cores in the magnetic amplifier, the 400 cycle signal is inherently amplified in accordance with the saturating effects introduced in the cores by the 1200 cycle signal. For a more complete description of the operation of the magnetic amplifier circuit, reference is made to my hereinabove mentioned Patent No. 2,725,521. The secondary winding of the output transformer 28, therefore, generates a current having both 400 and 1200 cycle components. As heretofore stated, condenser 25 connected across the secondary winding of the output transformer demodulates the output signal by reducing or eliminating the 1200 cycle carrier component thereof whereby only the 400 cycle component is applied to control winding 12 of the two-phase motor 13.

If, at a time when the setting of the motor controlled rotatable element 17 of the synchro-controlled transformer is in alignment with the control element 24, the input stage of the magnetic servo-amplifier should become unbalanced either as the result of changing temperature conditions of the two rectifiers of the input stage, by lack of identity between the magnetic characteristics of the two cores of the input stage or between the reverse- or leakage-current characteristics of the two rectifiers respectively connected thereto or for any reason which may cause asymmetry of the push-pull circuit, an output current may be applied to the control winding 12 of the motor 13. This current flowing through winding 12, however, is without torque-producing effect for the reason the frequency of this current is different from the frequency of the current continuously applied to the line field winding 14 and the motor, under these conditions, remains at rest. Stated somewhat differently, under these conditions no effective error signal would be applied to the rotatable element of motor 13. For this reason the system disclosed on Fig. 1 is inherently drift-free in contradistinction to other well known arrangements in which the amplifier is supplied directly with current of the same frequency as the exciting current of the line field winding 14 of the motor 13. Since signals of a fortuitous character such as those just described are applied to the control winding 12 of the motor 13 and these signals are an odd multiple of the frequency of the current applied to the line field winding, the motor does not respond to such signals and the system, therefore, does discriminate between control signals received from the rotor component 17 of the synchro-control transformer in response to movement of the control element 13 to a new setting which is of the same frequency as the frequency of current applied to the line field winding and therefore is effective to control the direction of operation and mating position of the motor 13 and those signals of fortuitous character originating within the magnetic servo-amplifier which occur as the result of undesired asymmetry.

The useful and novel circuit arrangement of Fig. 1 provides a system for automatic discrimination between fortuitous signals within the system applied to the motor 13 without causing operation of the motor and motor operating control signals, in contradistinction to prior art systems in which such fortuitous signals cause erroneous motor operation. The system of Fig. 1 causes the motor to respond only to signals generated by the rotor component 17 of the synchro-control transformer to the exclusion of all such fortuitous signals.

Figure 2:
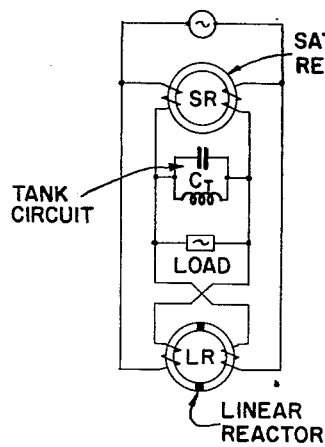
Fig. 2 illustrates in diagrammatic form a single-phase, bridge-type magnetic frequency tripler suitable for use with the circuit arrangement of Fig. 1.
Figure 3:
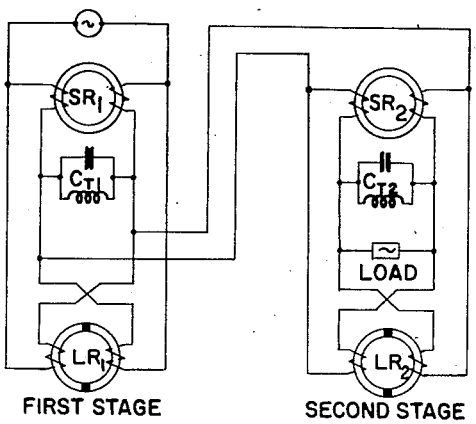
Fig. 3 is a circuit diagram on which is shown a two-stage, bridge-type magnetic frequency multiplier for use alternatively with the circuit arrangement of Fig. 1.
Figure 4:
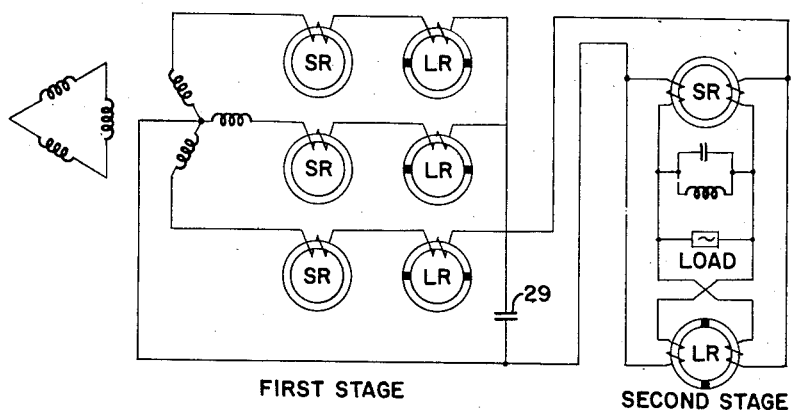
Fig. 4 is a circuit diagram of a two-stage, bridge-type magnetic frequency multiplier combining the features of Figs. 2 and 3 and suitable for use alternatively therewith.

Referring now to Figs. 2, 3 and 4, there are shown thereon three different types of frequency converter or magnetic-frequency-multiplier arrangements suitable for use with the system of Fig. 1. In Fig. 2, for example, is shown a single-phase, bridge-type frequency tripler of well known design. More specifically, the arrangement of Fig. 2 comprises a saturable reactor, a linear reactor and a tank or trap circuit in bridge connection, the tank circuit operating to by pass undesired frequencies when connected as illustrated in parallel with a load. The load of Fig. 2, in the instant case, may be the half-wave amplifier 10 of Fig. 1 or the equivalent thereof. The tripler of Fig. 2 operates to change the input or power supply frequency of 60 cycles, for example, applied thereto to an output frequency of 180 cycles or an input or power supply frequency current of 400 cycles to 1200 cycles, as the case may be. The term "input or power supply" as employed herein may be defined as either the input voltage or the input current of the tripler.

In the event that a higher ratio between carrier frequency and modulating frequency is desired, an arrangement such as shown in Fig. 3 may be employed. In this arrangement, two tripler circuits, Fig. 2, are connected in cascade whereby a frequency ratio of 1 to 9 is effected. For example, a voltage having a frequency of 60 cycles applied to the input of the multiplier of Fig. 3 emerges at a frequency of 540 and a 400 cycle voltage applied to the input emerges at a frequency of 3600 at the second stage thereof.

On Fig. 4 is shown a two-stage frequency multiplier in which the input is obtained from a three-phase power supply. The frequency multiplier of Fig. 4 comprises a three-phase input-stage tripler having the output thereof connected to the input of a single-phase output-stage tripler such as shown on Fig. 2. The first stage comprises three saturable reactors connected to the three windings respectively of a Y-connected secondary winding of a power supply transformer, the other terminal of each of these saturable reactors being connected to a linear reactor and thence by way of condenser 29 to the neutral wire of the Y-connected secondary winding. The output circuit is tapped off from the terminals of condenser 29.

By employing a linear reactor for each of the saturable reactors and a common condenser 29 in the manner shown, an improved output waveform is achieved which possesses the desirable characteristics of smoothness in operation and which is less critical to variations in power supply voltage applied thereto since it is well known that such changes in voltage may produce undesirable changes of the firing angle of the saturable reactors. The linear reactors and the condenser 29 therefore improve the reliability of operation of the frequency multiplier.

Whereas on Fig. 4, the saturable reactor elements and the linear reactor elements are formed on separate cores, it will be understood that this is by way of example only as the windings may be formed, if desired, upon a common core. Furthermore, the cores of the linear reactors are preferably composed of magnetic dust suitable for the purpose, such for example, as a material known in the trade as Permalloy-Dust.

Figure 5:
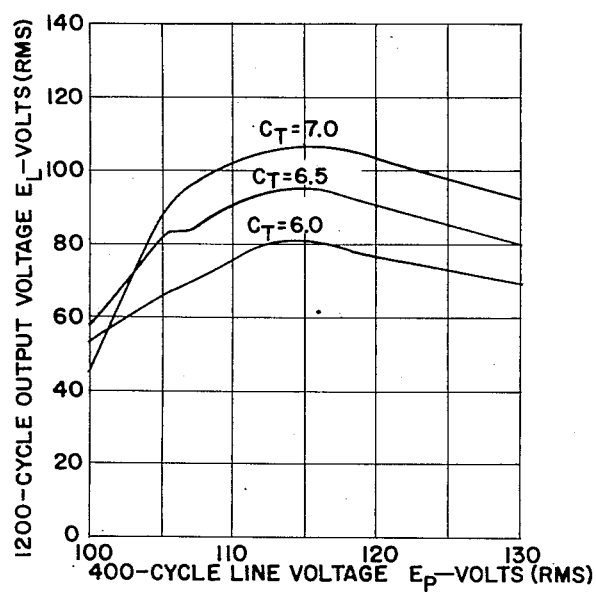
Fig. 5 is a chart in graph form on which is shown the variations in 1200 cycle output voltage for different values of capacitors in the tank circuit corresponding to variations in the 400 cycle line voltage.

Figs. 5, 6 and 7 are charts in graphic form illustrating performance characteristics of the magnetic frequency multipliers of Fig. 2 in accordance with actual tests performed thereon. Fig. 5, for example, discloses the relation between the magnitude of 1200 cycle output voltage as a function of the 400 cycle line voltage. Curve 31, for example, shows variations of output voltage with respect to variations in 400 cycle line voltage when the condenser in the trap circuit has a capacity of 7.0 microfarads. In like manner curves 32 and 33 show a similar relation between the output and line voltages when condensers of 6.5 microfarads and 6.0 microfarads respectively are employed. In a similar manner the relation of total input current of the magnetic frequency tripler as a function of 400 cycle line voltage is shown by curves 34, 35 and 36, Fig. 6, when tank condensers of 7.0 microfarads, 6.5 microfarads and 6.0 microfarads respectively are employed. On Fig. 7 is shown a curve 37 corresponding to the percent distortion of the fundamental component of the frequency multiplier output voltage as a function of 400 cycle line voltage applied thereto. It will be apparent from Figs. 5, 6 and 7 that variations in the 1200 cycle output voltage, input current and fundamental component distortion as the result of variations in the 400 cycle line voltage applied to the frequency multiplier have been proved by experimental investigations to have no substantial effect upon the proper operation of the system.

Whereas the invention has been described with particularity with respect to Fig. 1 on which is shown a two-stage half-wave magnetic servo-amplifier, it is not so limited as it may be advantageously employed with other types of push-pull magnetic amplifiers such, for example, as the type known in the art as the self-balancing potentiometer type generally referred to as self-balancing magnetic amplifiers. Furthermore, the invention is not to be limited to the two-phase reversible motor shown on Fig. 1 for the controlled element as it may be employed with equal facility and advantage to other forms of phase sensitive separately excited or phase-sensitive electro-responsive devices, the operation of which are based upon the cosine law or sine law, as the case may be.

Furthermore, the invention, according to the broader aspects thereof, may employ any electrical balancing system suitable for the purpose such, for example, as a phase-sensitive Wheatstone bridge, in lieu of the servo control arrangement disclosed.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A servo mechanism system comprising a push-pull magnetic amplifier including at least one pair of saturable core reactors having control windings and load windings thereon, a source of predetermined fundamental frequency alternating current, means for applying a harmonic carrier frequency of said current to said load windings, an electrical balancing system connected to said current source and energized thereby, a pair of settable elements in said balancing system and movable independently to different settings, means in said balancing system constructed and arranged to develop an error signal of said fundamental frequency proportional to the degree of mutual maladjustment of said settable elements, means operatively connecting one of said settable elements with the control windings of a pair of said saturable core reactors to provide operating potential therefor, an output circuit for said amplifier, a phase-sensitive electro-responsive device having a pair of control elements, one of said elements being connected to said current source and the other element connected to the output of said amplifier, means on said phase-sensitive device movable in either direction from a position of rest selectively in accordance with the algebraic phase difference of the currents flowing in each of said control elements and brought to rest when no current flows in one of said control elements, said phase-sensitive device being operable only when the currents flowing in said control elements are of the same frequency, and means operatively connecting said movable means to said one of the settable elements of said electrical balancing system in such manner that the electrical balancing system is restored to a state of balance by said phase-responsive device.

2. A claim according to claim 1 in which the phase-sensitive device comprises a two-phase reversible motor.

3. A claim according to claim 1 in which the harmonic frequency of said fundamental current is an odd multiple of the fundamental frequency.

4. A claim according to claim 1 in which said one of the movable elements of the electrical balancing system comprises a synchro-controlled transformer.

5. A claim according to claim 1 in which the magnetic servo amplifier is of the two stage half wave type.

6. A claim according to claim 1 in which means are connected across said amplifier output for removing the carrier frequency from the output current of the amplifier.

7. A claim according to claim 1 in which said control circuit comprises a second pair of said reactors.

8. A servo mechanism system comprising a source of alternating current having a substantially constant fundamental frequency, a magnetic frequency multiplier for multiplying said fundamental frequency to a predetermined odd harmonic thereof, a synchro-generator energized from said source, a synchro-control transformer operatively coupled to said generator for developing an error signal of said fundamental frequency, a push-pull magnetic amplifier including saturable core reactors having control windings and load windings, means including a plurality of circuit connections for continuously applying the harmonic frequency output of said multiplier to the load windings of said amplifier to provide operating potential therefor, and a 2-phase reversible induction motor having field windings and control windings, said current source being connected to the field windings and said amplifier being connected to supply a potential appearing in the output thereof to said motor control windings whereby said motor is responsive to an output signal from the amplifier corresponding to said error and non-responsive to the amplifier under no error signal condition.

9. In a magnetic amplifier system for controlling a phase-sensitive electro-responsive device, in combination, electrical balancing means comprising a synchro-generator settable selectively to different settings and a synchro-control transformer electrically connected thereto, said synchro-control transformer having a current generating element movable to a setting in matching relation with the instant setting of said synchro-generator, phase-sensitive electro-responsive motor means operatively connected to said rotatable element for actuating the rotatable element from an initial position of rest to a setting corresponding to the setting of said synchro-generator, said electro-responsive device having a control winding and a power supply winding, a source of substantially constant frequency electrical current continuously connected to said control winding and to said synchro-generator, means for establishing a plurality of electrical connections between said movable element of the synchro-control transformer and the input of said amplifier, means operatively connected to said source of current for applying a predetermined odd frequency harmonic thereof to said amplifier, means in said amplifier for modulating the harmonic frequency carrier current by the error voltage generated by the said synchro-control transformer, means for removing the carrier frequency from the output of the amplifier whereby only the amplified modulated current appears at the output thereof, and means connecting said amplifier output to the control winding of said phase-sensitive electro-responsive motor means whereby the movable element of the synchro-control transformer is moved in a direction toward the instant setting of the synchro-generator in accordance with a predetermined phase relationship between the currents supplied to said power and control windings of said electro-responsive motor means until the movable element of the synchro-control transformer has reached a matching position therewith.

References Cited in the file of this patent
UNITED STATES PATENTS

| 2,164,383 | Burton | July 4, 1939 |
| 2,519,365 | Goertz | Aug. 22, 1950 |
| 2,581,436 | McCarthy | Jan. 8, 1952 |
| 2,692,356 | Milsom | Oct. 19, 1954 |